United States Patent [19]

Nusbaumer et al.

[11] 4,421,137
[45] Dec. 20, 1983

[54] PLUG ASSEMBLY FOR SEALING A PRESSURE FLUID PASSAGE IN A MANIFOLD OR THE LIKE

[75] Inventors: Kay T. Nusbaumer, Fort Wayne; Terrell R. Whitaker, Huntington, both of Ind.

[73] Assignee: PHD, Inc., Fort Wayne, Ind.

[21] Appl. No.: 230,378

[22] Filed: Feb. 2, 1981

[51] Int. Cl.³ .............................................. F16L 55/12
[52] U.S. Cl. ........................................ 138/89; 29/521; 29/523; 411/49
[58] Field of Search ........................ 138/89; 220/347; 29/506, 523, 525, 521, 527.1; 411/44, 45, 49, 55

[56] References Cited

U.S. PATENT DOCUMENTS

| 688,756 | 12/1901 | Tripp | 411/57 X |
|---|---|---|---|
| 1,234,176 | 7/1927 | Kennedy | 411/44 |
| 2,764,184 | 9/1956 | Fitzhugh et al. | 138/89 |
| 2,796,907 | 6/1957 | Dumas | 411/55 |
| 2,836,918 | 6/1958 | Pula et al. | 138/89 X |
| 3,135,414 | 6/1964 | Lee | 138/89 X |
| 3,156,373 | 11/1964 | Willis | 138/89 X |
| 3,421,404 | 1/1969 | Jacobs | 411/55 |
| 3,525,365 | 8/1970 | Meulendyk et al. | 138/89 |
| 3,691,609 | 9/1972 | Ice et al. | 138/89 X |
| 3,941,028 | 3/1976 | Lobello et al. | 411/55 |
| 3,983,904 | 10/1976 | Laviano | 138/89 |
| 4,259,890 | 4/1981 | Walsh | 411/55 X |

FOREIGN PATENT DOCUMENTS

| 228096 | 5/1960 | Australia | 411/55 |
|---|---|---|---|
| 263925 | 7/1912 | Fed. Rep. of Germany | 411/55 |
| 662659 | 7/1938 | Fed. Rep. of Germany | 411/55 |
| 161549 | 2/1980 | Netherlands | 411/55 |
| 196342 | 2/1959 | Sweden | 411/55 |

Primary Examiner—James E. Bryant, III
Attorney, Agent, or Firm—George A. Gust

[57] ABSTRACT

A plug assembly comprising a generally cylindrical expansion sleeve having a socket portion which receives a wedging nut. One of the nut and socket portion is tapered such that the sleeve may be radially expanded as the nut enters more deeply into the socket portion. A screw element is threadedly received by the nut and by a clearance opening through the sleeve. The screw element is provided with a head which engages the sleeve on the side axially opposite the socket portion whereby threading of the screw element into the nut draws the latter more deeply into the socket portion. The outer periphery of the sleeve is preshaped to be out-of-round to provide for an interference fit with a cylindrical bore which is to be plugged.

11 Claims, 6 Drawing Figures

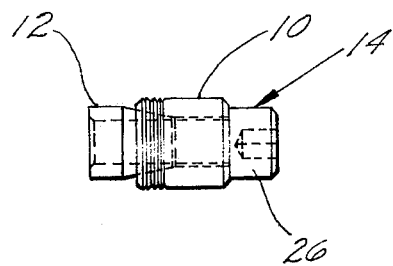
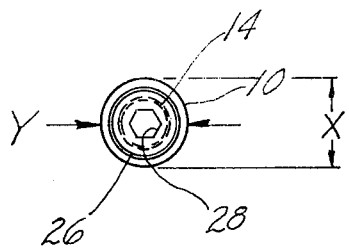
Fig. 1   Fig. 2
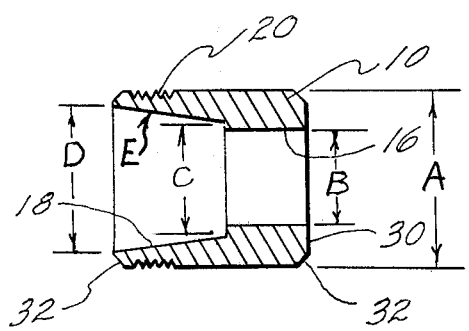
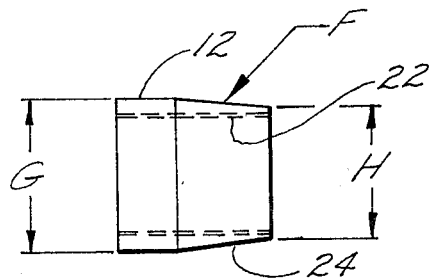
Fig. 3   Fig. 4
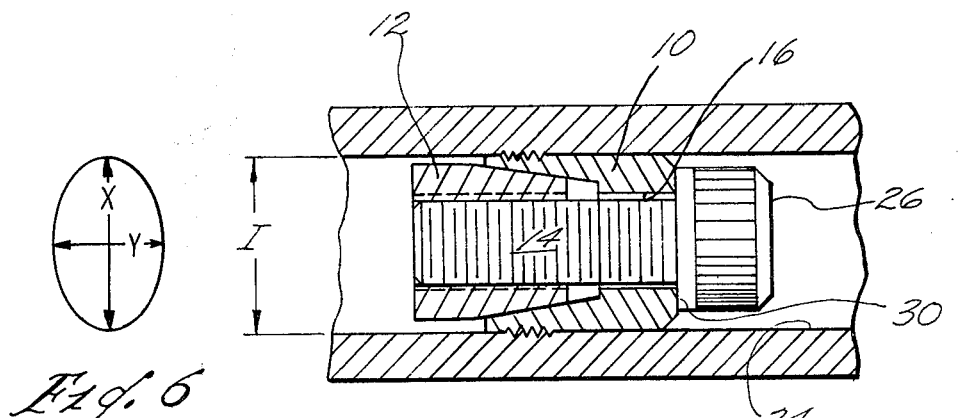
Fig. 6   Fig. 5

PLUG ASSEMBLY FOR SEALING A PRESSURE FLUID PASSAGE IN A MANIFOLD OR THE LIKE

BACKGROUND OF THE INVENTION

1. Field of the Invention

The present invention relates to sealing plugs and more particularly to a plug assembly preshaped to create a partial interference fit with a bore to be sealed for holding the plug parts against rotation while the expansion screw is tightened.

2. Description of the Prior Art

Sealing plugs have long been known in many different designs of varying complexity, with a simple and widely used form comprising a sleeve insert having a tapered inner surface and a correspondingly tapered locking member to be driven into the sleeve to expand the latter radially into sealing engagement with the passage. Various means have been used for forcing the locking member into the sleeve, including an expansion screw threaded into the locking member. During the threading of the expansion screw into the locking member, the locking member as well as the sleeve member must be restrained against rotation, this being accomplished by means of suitable tools or by accurately sizing the sleeve to have a force fit in the passage. These arrangements for so restraining the plug assembly are relatively complicated and expensive.

Some examples of prior art arrangements are shown in U.S. Pat. Nos. 2,062,519; 2,141,274; 2,836,918; 2,856,963; 2,923,323; 3,156,373; 3,333,724; 3,525,365; 3,893,487; 4,140,040 and 4,170,247.

SUMMARY OF THE INVENTION

This invention provides a plug assembly which includes a generally cylindrical expansion sleeve having a socket portion which receives a wedging nut of smaller diameter than the sleeve. One of the nut and socket potions is tapered such that the sleeve is radially expanded as the nut enters more deeply into the socket portion. A screw element is threadedly received by the nut and through a clearance opening in the sleeve. The screw element is provided with a head which engages the sleeve on the side axially opposite the socket portion whereby threading of the screw element into the nut draws the latter more deeply into the socket portion. The outer periphery of the sleeve is preshaped to be out-of-round by a predetermined degree to provide for an interference fit with a bore of cylindrical cross-section which is to be plugged.

The method of this invention relates to the fabricating of a plug assembly which comprises a cylindrical expansion sleeve having a socket which receives a tapered wedging nut. The nut is of smaller diameter than the sleeve. A screw element is threadedly received by the nut and through a clearance opening in the sleeve. A head on the screw element engages the side of the sleeve axially opposite the socket. The method comprises the steps of radially deforming the sleeve to an oblate shape which provides for a partial interference fit with a bore to be plugged while the screw element is being tightened. Radial forces caused by the wedging action due to the tightening secures the sleeve and nut to the bore and screw threads, respectively, forming a tight, leak-free plug.

It is an object of this invention to provide a plug assembly for sealing a pressure fluid passage in a manifold or the like which is simple and economical and may be conveniently installed.

It is another object of this invention to provide such a plug assembly wherein the sleeve is radially preshaped to be out-of-round thereby to provide for an interference fit during installation into a bore to be plugged.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 1 is a side view of one embodiment of this invention;

FIG. 2 is an end view thereof;

FIG. 3 is a longitudinal sectional view of the expansion sleeve thereof;

FIG. 4 is a side view of the tapered nut;

FIG. 5 is a longitudinal sectional view showing the plug assembly installed in a typical cylindrical bore; and FIG. 6 is an exaggerated geometrical outline of the oblate or out of round shape of the sleeve after being diametrically compressed.

DESCRIPTION OF THE PREFERRED EMBODIMENT

Referring to the drawings, the plug assembly of this invention includes essentially only three parts, a generally cylindrical expansion sleeve 10, a wedging nut 12 and a screw element 14 threaded into the nut 12. The sleeve 10 is formed with a coaxial opening 16 which receives the shank of the screw element 14 with clearance and a coaxial, tapered socket portion 18 which receives wedging nut 12. A series of concentric grooves 20 are provided in the outer periphery of the sleeve 10 radially opposite the socket portion 18 as shown, the grooves having walls which intersect at angles of about 60° thereby to provide relatively sharp, perimetral corners.

The wedging nut 12 is also generally cylindrical and has a coaxial bore 22 which is threaded and a portion 24 of its outer periphery which is tapered or cone shaped as shown. The tapers 18 and 24 in the sleeve and nut preferably are complementary. The nut 12 itself is of smaller diameter than the sleeve 10.

The screw element 14 is provided with a conventionally shaped head 26 having a hexagonal socket 28 for receiving a typical wrench. The head 26 is of smaller diameter than the sleeve 10 and is engageable with the flat end surface 30 of the sleeve 10 as shown in FIG. 5.

The sleeve 10 is provided with 45° chamfered corners 32 as shown which serves the purpose of facilitating entry of the sleeve into a bore to be plugged as will be explained in more detail in the following. In the preferred embodiment, the sleeve 10 is formed of low-yield stainless steel, the wedging nut 12 of cold rolled steel, and the screw 14 of a relatively hard steel, preferably harder than that of the wedging nut 12. More particularly, the sleeve 10 is preferably formed of No. 303 stainless steel.

A further fabricating step is as follows. The various parts are assembled as shown in FIGS. 1 and 5 and the screw element is hand tightened into the wedging nut 12. The nut 12 is then grasped with a suitable set of pliers and a wrench is inserted into the socket 28 of the screw head and the screw element is then tightened into the nut 12 a quarter turn.

Using an arbor press, the sleeve 10 is diametrically compressed until the clearance opening 16 bottoms out on the screw threads of element 14. This results in forming the sleeve 10 into an oblate shape with the minor axis being on the diameter indicated by the arrows "Y" and the major axis at right angles thereto and as indicated by the diameter "X".

In one embodiment, the outer diameter of the sleeve 10 before deforming is no larger than the diameter of a bore to be plugged, such compressing being performed with a force which forms said oblate shape to a size in which the major diameter is slightly larger than the diameter of the bore. The sleeve is thus out of round as compared with the original round, cylindrical shape.

The plug assembly with the sleeve thus preshaped, is now ready to be inserted into a bore which is to be plugged. With the screw element tightened into the wedging nut 12 as described above, the assembly is press fit into a bore 34 to the location where a seal is desired. A suitable rod may be used for pushing and forcing the plug assembly to this desired location. By reason of the interference fit provided by the oblate shape of sleeve 10, it will now be held against rotation while an Allen wrench inserted into the socket head of the screw element 14 is used to tighten the latter into the wedging nut 12. The frictional fit between the wedging nut 12 and sleeve 10 prevents the nut 12 also from rotating while the screw element is being turned. The screw element 14 is tightened sufficiently to cause the wedging nut 12 to expand radially the wall of the sleeve 10 which surrounds the socket portion 18 thereby causing the serrations 20 to bite into the bore wall and the reaction to exert a force radially inwardly on the nut 12 which causes the threads of the nut to squeeze onto and seal against the threads of the screw element 14. The bore 34 is thus sealed by the engagement of the outer periphery of the sleeve 10 with the bore wall itself, the tapered portions of the nut and sleeve against each other and the tight engagement of the nut threads onto the screw threads. When the assembly is suitably tightened, the wrench used for turning the screw element is merely withdrawn from the bore.

In the following is given a typical set of dimensions for plugging a straight cylindrical bore 34 having a diameter of from 0.565 to 0.585 inch. The letter symbols appear in the drawings and refer to diameters except as otherwise noted.

A—0.565 inch
B—0.328 inch
C—0.394 inch
D—0.468 inch
E—15°
F—15°
G—0.500 inch
H—0.434 inch
I—0.565–0.585 inch
X—0.588 inch
Screw element 14 5/16–24X ¾

The sleeve length is ⅝ inch, the depth of the socket 18 is ⅜ inch. The length of the wedging nut 12 is ½ inch and the length of the tapered surface 24 is 5/16 inch. The materials used are as explained hereinabove.

Recapitulating the installation, after the plug assembly has been hand tightened, the screw element tightened an additional quarter turn and the diameter compressed into an oblate shape, the assembly is force fitted into the bore 34 to the desired depth. A suitable Allen wrench inserted into the socket head 26 is then used to tighten the screw 14 to a torque of about 50 pound-feet. The plug is now installed and the wrench may be withdrawn from the bore.

Significantly, the wedging nut 12 is of smaller outer diameter than the sleeve 10 and the bore into which the assembly is inserted. Thus, when the assembly is pressed to the desired location within the bore, it is the sleeve that is in engagement with the bore wall. Tightening of the screw in the wedging nut thus does not shift the sleeve either rotationally or axially. If the wedging nut were of larger diameter so as to have a force fit in the bore and this nut were located in the bore where desired, tightening of the screw eventually expands the sleeve to the point at which it grips the bore wall more forcefully and thereafter draws the nut axially thereinto altering the plug location. Thus, since in the present invention the sleeve is larger in the first instance than the wedging nut, the assembly remains during tightening where it is initially set. This facilitates accurate installation.

As will now be apparent, the plug assembly is the ultimate in simplicity and economical to manufacture. It may be installed with ease requiring a minimum of time. It requires no special tools, is leak-free, it blocks pressure from both sides, is permanent, and may be inserted to any depth into blind or through bores. The outer sleeve on the plug assembly is preshaped to create a partial interference fit with the bore and wedging nut keeping these components held in position while the screw is tightened. Radial forces caused by the wedging action of the nut secures the sleeve and the nut to both the bore and the threads of the screw element, respectively, forming a vibration proof, leak-free plug. Preshaping the sleeve 10 in an arbor press is a simple procedure yet it results in providing a suitable interference fit which holds the elements in position during tightening. In order to facilitate insertion of the plug assembly into a bore, the end edges of the sleeve 10 are chamfered as indicated by the numeral 32.

While there have been described above the principles of this invention in connection with specific apparatus, it is to be clearly understood that this description is made only by way of example and not as a limitation to the scope of the invention.

What is claimed is:

1. A plug assembly for plugging the opening of a cylindrical passage comprising a generally cylindrical but out of round expansion sleeve having a socket portion, an expanding nut engageably received by said socket portion, one of said nut and socket portion being tapered such that said sleeve is radially expanded as said nut enters more deeply into said socket portion, the outer periphery of said sleeve being circumferentially continuous and uninterrupted, the engageable portions of said nut and socket being circumferentially continuous and uninterrupted, a screw element threadedly received by said nut and through a clearance opening in said sleeve, said screw element having a head engaged with said sleeve on the side thereof axially opposite said socket portion whereby threading of said screw element into said nut draws the latter more deeply into said socket portion, and the outer periphery of said sleeve being out of round by a predetermined degree to provide for an interference fit with a bore which is round in cross-section, said sleeve periphery being adapted to provide a circumferential seal with a bore in which it is mounted, said engageable portions of said nut and socket being in a circumferential sealing engagement and said nut sealing against the threads of said screw element when the latter is tightened and said sleeve is sealed within a bore.

2. The plug assembly of claim 1 wherein said nut and socket portion have complementary tapers, the outer diameter of said nut being smaller than that of said sleeve.

3. The plug assembly of claim 2 wherein the material of said sleeve is more yieldable than that of said nut and said nut is yieldable radially inwardly into sealing engagement with the threads of said screw element.

4. The plug assembly of claim 3 wherein said sleeve is stainless steel, said nut of cold rolled steel and said screw element of material as hard as said nut.

5. the plug assembly of claim 4 wherein said side of said sleeve is flat and at right angles to the axis of said screw element, said head being smaller in radial dimension than said sleeve, said socket portion haing an axial depth shorter than the axial dimension of said sleeve, said tapers being at an angle of about 15° with respect to the axis of said nut and sleeve, and a plurality of concentric sealing grooves in the outer periphery of said sleeve radially opposite said socket portion.

6. The plug assembly of claim 1 wherein said out of round shape of said sleeve is oblate.

7. The method of fabricating a plug assembly for plugging the opening of a cylindrical passage wherein said plug assembly comprises a cylindrical expansion sleeve which is circumferentially continuous and uninterrupted, and having a socket which engageably receives a tapered expanding nut, said nut being of smaller diameter than said sleeve, the engageable portions of said nut and socket being circumferentially continuous and uninterrupted, a screw element threadedly received by said nut and through a clearance opening in said sleeve, a head on said screw element engaging the side of said sleeve axially opposite said socket; said method comprising the steps of threading said screw element into said nut for tightening said nut into said socket with a predetermined force, radially compressing said sleeve until said clearance opening bottoms onto said screw element and radially deforming said sleeve whereby the outer periphery is out of round.

8. The method of claim 7 wherein said deforming step includes compressing said sleeve radially until it assumes an oblate shape.

9. The method of claim 7 wherein the outer diameter of said sleeve before deforming is no larger than the diameter of a bore to be plugged, said compressing being performed with a force which forms said oblate shape to a size in which the major diameter is slightly larger than the diameter of said bore.

10. The method of claim 9 including the step of chamferring the opposite ends of said sleeve to an extent as will permit said sleeve after deformation to be entered into said bore.

11. The method of claims 7 or 9 including the step of forcing said assembly into an elongated bore to a location where the bore is to be plugged, then forceably threading said screw element into said nut until said sleeve is expanded into sealing engagement with the bore wall and the nut is radially compressed into sealing engagement with the threads of said screw element.

* * * * *